United States Patent [19]

Andree et al.

[11] Patent Number: 4,742,401
[45] Date of Patent: May 3, 1988

[54] OPTO-ELECTRONIC SCAN HEAD WHICH HAS A HOUSING PORTION AND A HOUSING MEMBER THAT ARE COUPLED TOGETHER BY FIRST AND SECOND GUIDE RODS SO AS TO ALLOW RELATIVE MOTION THEREBETWEEN

[75] Inventors: Klaus Andree; Ralf Balzeit, both of Preetz; Ulrich Parl, Raisdorf; Lutz Rebetge, Kiel, all of Fed. Rep. of Germany

[73] Assignee: Dr. Ing. Rudolf Hell GmbH, Fed. Rep. of Germany

[21] Appl. No.: 922,334

[22] Filed: Oct. 23, 1986

[30] Foreign Application Priority Data

Oct. 24, 1985 [DE] Fed. Rep. of Germany ....... 3537857

[51] Int. Cl.$^4$ ............................................. H04N 1/06
[52] U.S. Cl. .................................... 358/293; 358/227; 358/292; 350/379; 350/430; 355/56
[58] Field of Search ............... 358/292, 293, 294, 227, 358/285; 350/374, 379, 430; 352/139, 140; 355/56, 55

[56] References Cited

U.S. PATENT DOCUMENTS

| | | | |
|---|---|---|---|
| 3,466,451 | 9/1969 | Hanchett | 358/293 |
| 4,403,235 | 9/1983 | Fedder et al. | 358/293 |
| 4,422,097 | 12/1983 | Inuiya | 358/227 |
| 4,487,482 | 12/1984 | Itoh et al. | 358/294 |
| 4,488,804 | 12/1984 | Takagi | 355/56 |
| 4,563,705 | 1/1986 | Oinoue et al. | 358/227 |
| 4,620,233 | 10/1986 | Ogawa | 358/293 |
| 4,658,301 | 4/1987 | Toyoda | 358/293 |

FOREIGN PATENT DOCUMENTS

| | | |
|---|---|---|
| 177461 | 4/1986 | European Pat. Off. . |
| 3142429 | 7/1982 | Fed. Rep. of Germany . |
| 3500129 | 7/1985 | Fed. Rep. of Germany . |
| 3509228 | 9/1985 | Fed. Rep. of Germany . |
| 152326 | 7/1985 | United Kingdom . |

Primary Examiner—Tommy P. Chin
Attorney, Agent, or Firm—Hill, Van Santen, Steadman & Simpson

[57] ABSTRACT

An opto-electronic scanning head for drum and flat bed scanning apparatus for point-by-point and line-by-line scanning of opaque and transparent originals which are illuminated point-by-point. The housing of the scanning head 7 has a front panel 9 which is displaceable along the optical axis 12 of the scanning objective lens 11 and has a housing part which is stationary with respect to the optical axis 12. The scanning objective 11 is mounted in the front panel 9, but the diaphragm 13 and the opto-electronic transducer 14 are mounted in the housing portion 8. The scanning objective 11 can be displaced over a broad range with a sensitive adjustment mechanism for the front panel 9 so that the focus range can always be placed into the image plane of the originals and thus optimum image sharpness can be achieved for originals having all different thicknesses. In the scanning head 7 for opaque scanning, the illumination system 27, 28, 29, and 31 is used for the point to point illumination of the originals and the illumination system is arranged in the displaceable front panel 9 such that the optical axis 30 extends through the focus range of the scanning objective 11 and as a result the illumination system 27, 28 and 29 always generates a focus illumination point on the original regardless of the position of the front panel 9 or of the scanning objective 11 so that optimum illumination of the originals is always achieved for all thicknesses of originals and also the optimum image is maintained sharp.

4 Claims, 2 Drawing Sheets

OPTO-ELECTRONIC SCAN HEAD WHICH HAS A HOUSING PORTION AND A HOUSING MEMBER THAT ARE COUPLED TOGETHER BY FIRST AND SECOND GUIDE RODS SO AS TO ALLOW RELATIVE MOTION THEREBETWEEN

BACKGROUND OF THE INVENTION

1. Field of the Invention

The present invention relates in general to the field of electronic reproduction technology and involves an optoelectronic scanning head for drum or flat bed scanning apparatus for point-by-point and line-by-line scanning of opaque and transparency originals.

2. Description of the Prior Art

In drum scanning apparatus, the original which is to be reproduced is mounted on a scanning drum which serves as the original carrier and is read point-by-point and line-by-line by an opto-electronic scanning head which moves axially along the rotating scanning drum. The scanning head essentially contains a scanning objective lens, a diaphragm and an opto-electronic transducer. The original is illuminated point-by-point and the scanning light emanating from the illumination spot on the original is modulated with the information content of the original and passes through the scanning objective and through the diaphragm to the opto-electronic transducer which converts the scanned light into an electrical image signal. When scanning transparency originals, the illumination system is mounted in the inside of the scanning drum which is composed of transparent material and the scanning light is allowed to pass through the transparency original and proceeds into the scanning head and the illumination system and scanning head are synchronously moved in the axially direction of the scanning drum. When scanning opaque originals, the illumination system is a component part of the scanning head and the scan light is reflected by the opaque original and is evaluated by the scanning head. In a flatbed scanning apparatus, the original carrier is a flat planar surface.

So as to scan the originals with optimum image sharpness, the range of focus of the scanning objective must lie in the image planes of the original or, respectively, the distance between the image planes and the scanning objective must always be constant. However, originals which have different thicknesses must be scanned and the scanning drums have different diameter tolerances when manufactured so that the image sharpness must be repeatedly monitored and corrected when necessary. In conventional scanning heads, the correction of the image sharpness is possible only to a limited degree since the scanning objectives can only be moved in a narrow range along their optical axis and this however is not sufficient to achieve an optimum adjustment of the image sharpness and, thus, good scanning quality for all thicknesses of originals do not occur. In order to eliminate this disadvantage, various scanning drums have been proposed which have differences of radiuses which correspond to the most frequently occurring thicknesses of originals. Although the respective distance between the image plane and the scanning objective could thereby be kept nearly constant, this measure is extremely complicated and requires the changing of the scanning drum for originals of different thicknesses.

In the assembly of traditional scanning heads for opaque scanning, the illumination system which is integrated in the scanning head is adjusted and fixed one time in a fashion such that the illumination spot for a rated position of the scanning objective is sharply imaged. However, the sharp imaging of the illumination spot is lost when the scanning objective is moved from its standard position for setting the image sharpness. A further disadvantage of traditional scanning heads is that a corresponding readjustment of the illumination system is frequently not possible at all and can only be implemented with difficulty and with a great expenditure of time by an inexperienced operator.

SUMMARY OF THE INVENTION

It is therefore an object of the present invention to provide an opto-electronic scanning head for scanning apparatus for scanning transparency and opaque originals wherein an optimum adjustment of the image sharpness and of the illumination spot can be quickly, accurately and precisely executed for a broad range of thickness of the originals.

It is a feature of the present invention that an opto-electronic scanning head for point-by-point and line-by-line scanning of originals which are illuminated and which are mounted on carriers for the originals and the scanning apparatus and the scanning head comprises a housing which receives the scanning system and includes a scanning objective, optoelectronic means for generating at least an electrical scanning signal which are mounted along the optical axis of the scanning objective. The distance of the scan system from the originals mounted on the carrier is variable and wherein the housing is composed of a housing portion facing the original carrier which is moveable along the optical axis and has a housing portion facing away from the original carrier which is stationary with respect to the optical axis. The scanning objective is mounted in the moveable housing portion and the optoelectronic means for generating at least an electrical scanning signal are arranged in the stationary housing portion so that the distance of the scanning objective from the surface of the original carrier can be varied.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1A:
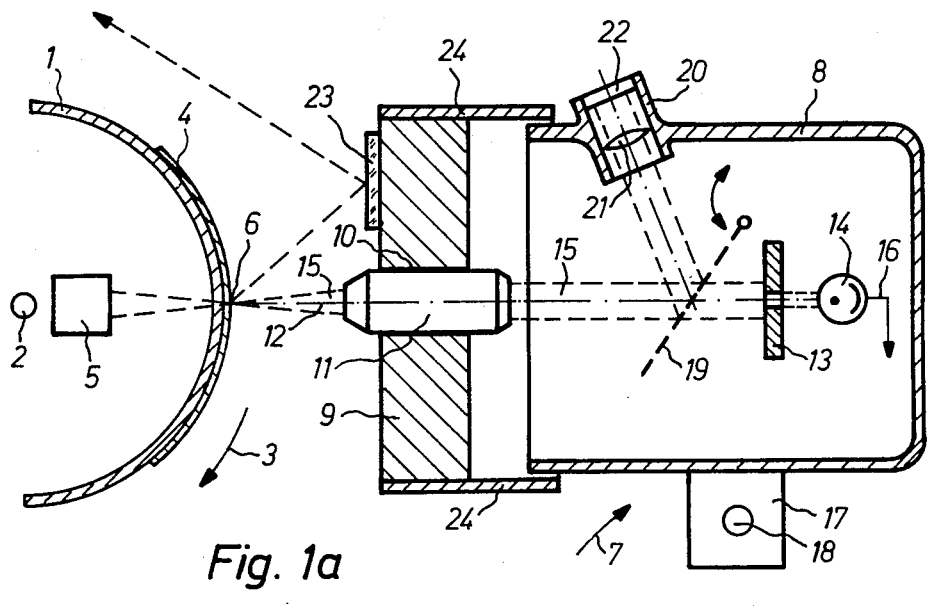
FIGS. 1a and 1b are sectional views through scanning heads.
Figure 1B:
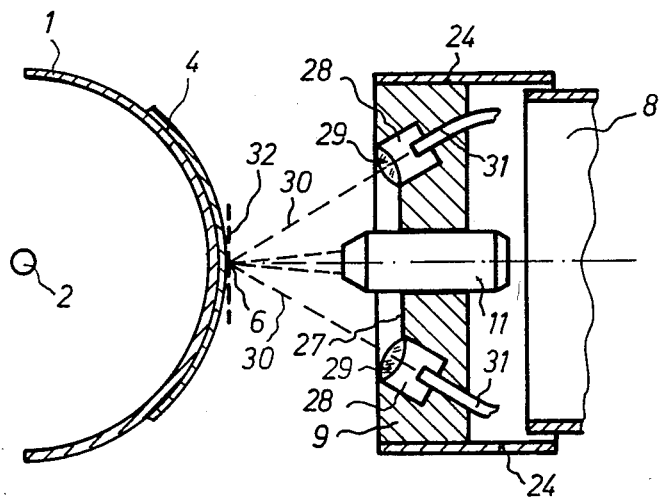

FIGS. 1a and 1b illustrate radial sectional views through a portion of a scanning drum of a drum scanning apparatus not shown in greater detail and also show the corresponding sectional views through scanning heads along their optical axes.

FIG. 1a is a sectional view for the scanning of transparencies. The original carrier is a scanning drum 1 formed of transparent material which rotates about a shaft 2 which extends perpendicular to the plane of the drawing and rotates in the direction of arrow 3. A transparency original 4 which is to be scanned is mounted on the scanning drum 1. A moveable illumination system 5 is mounted in the inside of the scanning drum 1 and generates an illumination spot 6 in the image plane of the transparency original 4 and the transparency original 4 is illuminated point-by-point and line by line by the illumination spot 6 due to the movement of the illumination system 5 in the direction of the shaft 2 and due to the rotation of the scanning drum 1. The means for moving the illumination system 5 may comprise a horizontal shaft parallel to the shaft 2 which is formed with threads that engage the illumination system 5 so as to move it synchronously with the scanning head 7. The scanning head 7 of the drum scanning apparatus is essentially composed of a housing 8 which is open in the direction of the scanning drum 1 and in which a front panel 9 is mounted which faces the scanning drum 1. The front panel 9 of the scanning head 7 is formed with an opening 10 in which a scanning objective lens 11 is mounted and is rigidly connected to the front panel 9. The optical axis 12 of the scanning objective 11 extends in the radial direction of the scanning drum 1. Opto-electronic means for generating at least an electrical scanning signal, comprising at least a picture element diaphragm 13 and an opto-electronic transducer 14 which are fixedly mounted to the housing 8 are located in the housing 8 of the scanning head 7 in the beam path of the scanning objective lens 11 along the optical axis 12. There can be also provided (not shown) a second diaphragm and a second opto-electronic transducer for generating an electrical outer field scanning signal for electronical detail enhancement as described in the copending U.S. patent application Ser. No. 246160, filed 3/23/1981, corresponding to European patent No. 0 036 548.

The scanning light beam 15 eminating from the illumination spot 6 on the transparency original 4 and modulated with the information content of the transparency original 4 is projected through the scanning objective lens 11 onto the picture element diaphragm 13. The picture element diaphragm 13 limits the scanning light beam 15 such that only the scanning light eminating from the actual picture element within the illumination spot 6 impinges upon the opto-electronic transducer 14 where it is converted into an electrical image signal which is supplied to a feedline 16.

Figure 2:
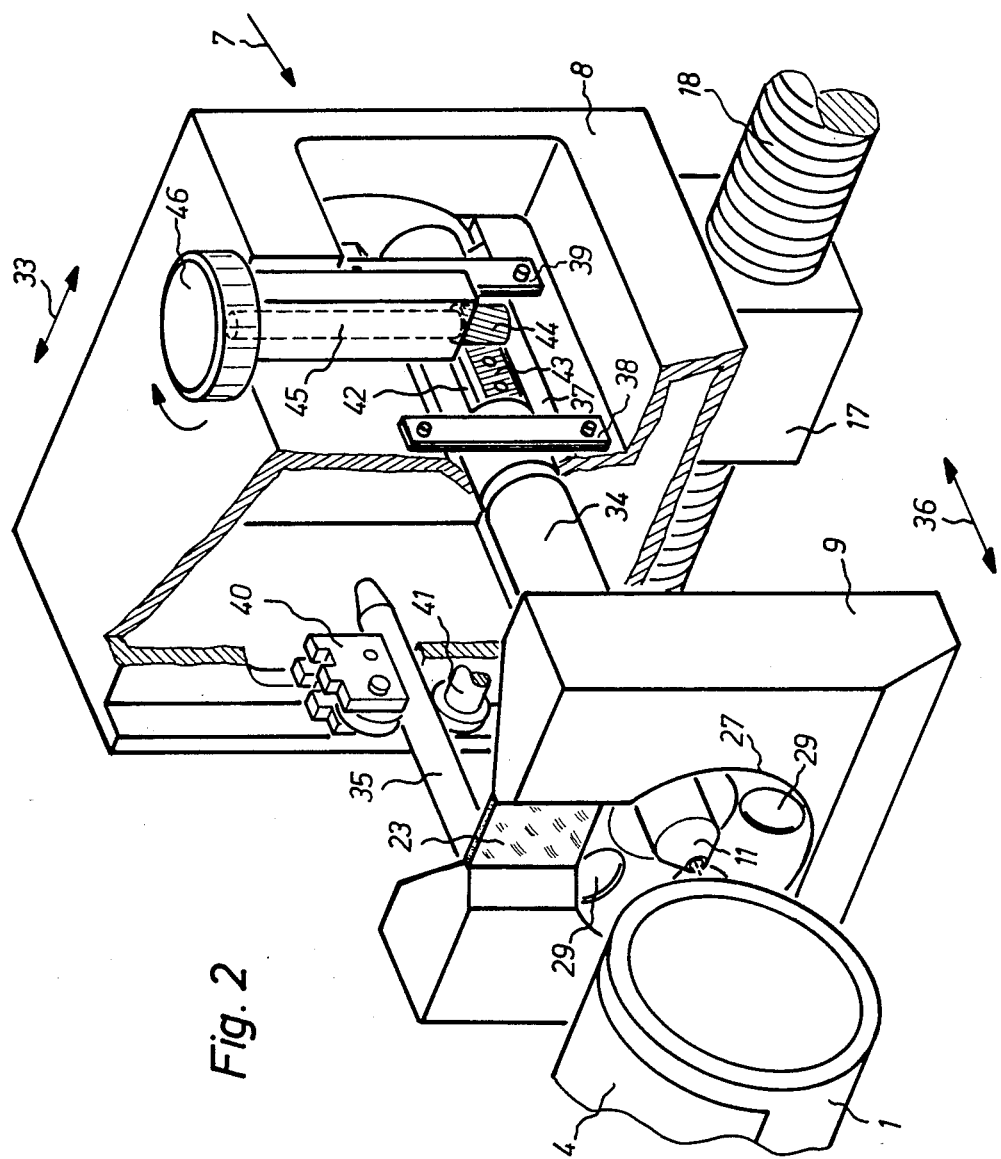
FIG. 2 is a partially cut-away perspective view of a scanning head according to the invention.

The front panel 9 of the scanning head 7 is connected to the housing by means of a displacement mechanism not shown in FIG. 1, but is illustrated in FIG. 2 such that the front panel 9, including the scanning objective lens 11, can be displaced relative to the housing 8 in a large range in the direction of the optical axis 12. The focus range of the scanning objective lens 11 can thereby always be placed in the image plane of the original which is to be scanned so that optimum image sharpness and thus a high scanning quality is achieved for different thicknesses of originals.

A transporting threaded nut 17 is attached to the bottom of the housing 8 and the transport nut 17 threadedly engages a feed spindle 18 which extends parallel to the shaft 2 of the scanning drum 1. By rotating the feed spindle 18, the housing 8 of the scanning head 7 can be caused to move into and out of the plane of the drawing of FIG. 1a so as to scan the original 4 as the drum 1 is rotated and as the light source 5 and the scanning head 8 are moved in the axial direction with the distance between the objective and the scanning drum remaining fixed.

A mirror 19 which can be tilted is indicated with broken lines in FIG. 1a, can be pivoted into the scanning light beam 15 emerging from the scanning objective lens 11 and the tilted mirror 19 reflects the scanning light beam 15 in the direction of a viewing tube 20 which includes a magnifier 21 and a ground glass screen 22. An enlarged image of the momentarily scanned picture element and of its immediate surroundings will thereby appear on the ground glass screen 22 where it can be observed by an operator who can adjust the sharpness of the image by moving the front panel 9.

It can be observed from the operating side of scanning apparatus that the scanning head 7 in most drum scanning apparatuses is situated behind the scanning drum 1 so that it is often difficult for the operator to view the location of the original on the backside of the scanning drum because it is momentarily covered by the scanning head 7 or to set the scanning head 7 to prominent points of the original for purposes of apparatus calibration. For this reason, a mirror 23 is attached to the front panel 9 above the scanning objective 11 and the operator can without problems view and evaluate the respective picture element environment on the transparency original by using the mirror 23.

A coverhood 24 is also attached to the front panel 9 and extends over the open side of the housing 8 and protects the interior of the housing against incident extraneous light.

FIG. 1b illustrates a modification and shows the corresponding sectional views for opaque scanning of an opaque original 4 which essentially differs from the sectional view shown in FIG. 1a in that the illumination system 5 is not mounted in the inside of the scanning drum 1 but forms a component part of the scanning head 7. For this embodiment, the front panel 9 is additionally provided with a conical recess 27 which is symmetrically formed relative to the optical axis 12 of the scanning objective lens 11. The side wall of the recess 27 is formed with a plurality of openings 28 distributed about the scanning objective 11 of which only two are visible in the sectional view of FIG. 1b. Illumination optics or condensers 29 of the illumination system are arranged in the openings 28 and these are aligned at one time during assembly of the scanning heads such that their optical axes 30 extend through the focal range of the scanning objective 11 as shown. The illumination light generated by the light source, not shown, of the illumination system is carried by light conducting cables or fibers 31 to the individual condensers 29 and is superimposed by these in a focused illumination point 6 in the sharpness plane 32 of the scanning objective lens 11. Since the position of the optical axes 12 and 30 relative to each other is maintained during displacement of the front panel 9, the scanning objective always sees a focused illumination spot 6 regardless of the position of the front panel 9. When the focus range of the scanning objective lens 11 is then placed into the image plane of the opaque original which is momentarily being scanned then an optimum illumination of the original and an optimum image sharpness are achieved in an advantageous way according to the invention.

The invention is not limited to the exemplary embodiments which have been described. The scanning head can also be employed in a flat bed scanning apparatus. In this case, the original carrier is a planar surface which moves relative to the scanning head and the scanning head contains a line of photodiodes or a matrix of photodiodes for converting the scanning light instead of containing an individual discrete optoelectronic transducer. The illumination system illustrated in the scanning head for opaque scanning can also be modified in any form. The scanning head of the invention, of course, can also contain auxiliary devices for electronic unsharp masking and/or for scanning color originals.

FIG. 2 comprises a cut-away perspective view of a scanning drum 1 and a scanning head 7 for opaque scanning and forms the basis of the structural design of the displacement mechanism between the housing 8 and the front panel 9. The opaque original 4 which is to be scanned is mounted on the scanning drum 1 as shown. The scanning objective lens 11, the conical recess 27 as well as the condensers 29 of the illumination system are grouped around the scanning objective lens 11 and the mirror 23 are visible at the front side of the front panel 9. The transport nut 17 is connected to the housing 8 and the scanning threaded spindle 18 engages the threads of the transport nut 17 and as the spindle 18 is rotated, it moves the scanning head 7 axially along the scanning drum 1 in the direction of the arrow 33. Two guide rods 34 and 35 are attached to the front panel 9 and extend parallel to each other and extend into the housing 8 and are moveably guided or, respectively, seated such that the distance of the front panel 9 and the scanning objective from the scan drum 1 can be adjusted in the radial direction indicated by arrow 36. A part of the housing wall is formed as a guide channel 37 into which the guide rod 34 is received and is formed with suitable low friction gliding material to minimize friction. The guide rod 34 is mounted in the guide channel in a gliding and playfree manner and is seated therein by means of two springs 38 and 39 mounted as shown. The second guide rod 35 moves between two roller bearings 40 and 41 which are attached to the housing 8. The guide rod 34 serves as a drive element for the movement of the front panel 9. For this purpose, the guide rod 34 is formed with a rectangular recess 42 on a surface which extends in the longitudinal direction in the region of the guide channel 37. A toothed rack 43 is attached to the guide rod 34 in the recess 42 and the length of the toothed rack determines the maximum possible displacement of the front panel 9 in the radial direction. A pinion 44 mounted perpendicular to the displacement direction engages the toothed rack 43 and the pinion 44 is connected to a knob 46 by a shaft 45 rotatably mounted in the housing 8. By turning the knob 46 which turns the pinion 44 causes the toothed rack 43 to execute a corresponding straight line displacement in the direction of arrow 36 toward or away from the scanning drum 1 so as to move the front panel 9 through the guide rod 34. Thus, a sensitive displacement is advantageously possible by selecting a suitable pitch for the toothed rack 43 and the pinion 44.

In operation, the operator turns the knob 46 until a sharp focused image is obtained for the particular master 4 which is being scanned on the drum 1. When masters of different thicknesses are mounted on the drum, the operator can again adjust the knob 46 to obtain a sharp focused image for the master.

Although the invention has been described with respect to preferred embodiments, it is not to be so limited as changes and modifications can be made which are within the full intended scope of the invention as defined by the appended claims.

We claim as our invention:

1. An opto-electronic scan head for point-by-point and line-by-line scanning of originals arranged on an original carrier, comprising:
    (a) a scanning system comprising a scanner lens (11), a diaphragm (13) and at least one opto-electronic transducer (14) which are arranged along the optical axis (12) of said scanner lens (11);
    (b) a housing portion (9) facing toward said original carrier (1) displaceable along said optical axis (12), said scanner lens (11) mounted in said housing portion (9);
    (c) a housing member (8) mounted away from said original carrier (1) and stationary with respect to said optical axis (12), said diaphragm (13) and said opto-electronic transducer (14) mounted on said housing member,
    (d) first and second guide rods (34, 35) extending in the direction of said optical axis (12) parallel to one another and secured to said displaceable housing portion (9) and said guid rods projecting into said stationary housing member (8);
    (e) a friction bearing (37, 38, 39) for sliding and play-free bearing said first guide rod (34) and a roller bearing (40, 41) for guiding said second guide rod (35) and said friction bearing and said roller bearing mounted in said stationary housing member (8);
    (f) a toothed rack (43) extending in the direction of said optical axis (12) and secured to said first guide rod (34) which is guided in said friction bearing (37, 38, 39);
    (g) a pinion (44), rotatably supported perpendicular to said optical axis (12) and engageable with said toothed rack (42); and
    (h) a shaft (45) rotatably mounted in said stationary housing member (8) said pinion (44) mounted on one end of said shaft and a knob (46) mounted on the other end of said shaft, whereby a corresponding variation of the distance of said scanner lens (11) from the surface of said originals carrier (1) is effected by turning said knob (46).

2. A scan head according to claim 1, wherein said friction bearing (37, 38, 39) is formed of a guide channel formed in said stationary housing member (8) and said guide channel is clad with a foil and of leaf springs (38, 39) for holding said guide rods (34, 35) in said guide channel (37).

3. A scan head according to claims 1 or 2, wherein for scanning opaque originals, at least one light source (29) is secured to said displaceable housing portion (9) and is aligned relative to said scanner lens (11) such that the intersection of the optical axis (30) of said light source (29) with said optical axis (12) lies in the sharpness region of said scanner lens (11).

4. A scan head according to claims 1 or 2, wherein a mirror (23) is attached above the scanner lens (11) to the side of said displaceable housing portion (9) facing toward said originals carrier (1).

* * * * *